(12) United States Patent
Asao et al.

(10) Patent No.: US 7,378,041 B2
(45) Date of Patent: May 27, 2008

(54) ELECTRODE MATERIAL FOR LITHIUM SECONDARY BATTERY, ELECTRODE STRUCTURE COMPRISING THE ELECTRODE MATERIAL AND SECONDARY BATTERY COMPRISING THE ELECTRODE STRUCTURE

(75) Inventors: Masaya Asao, Kyoto (JP); Soichiro Kawakami, Nara (JP); Takao Ogura, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 10/809,483

(22) Filed: Mar. 26, 2004

(65) Prior Publication Data

US 2004/0248011 A1 Dec. 9, 2004

(30) Foreign Application Priority Data

Mar. 26, 2003 (JP) .............................. 2003-086628

(51) Int. Cl.
*H01B 1/04* (2006.01)
(52) U.S. Cl. ............................. 252/521.3; 429/218.1; 429/232
(58) Field of Classification Search ............. 252/518.1, 252/521.3, 520.1; 429/218.1, 232
See application file for complete search history.

(56) References Cited

U.S. PATENT DOCUMENTS

| | | | |
|---|---|---|---|
| 5,795,679 A | 8/1998 | Kawakami et al. | .......... 429/218 |
| 6,051,340 A | 4/2000 | Kawakami et al. | ..... 429/231.95 |
| 6,383,686 B1 | 5/2002 | Umeno et al. | ........... 429/251.8 |
| 6,432,585 B1 | 8/2002 | Kawakami et al. | .......... 429/233 |

(Continued)

FOREIGN PATENT DOCUMENTS

EP 0323888 * 7/1989

(Continued)

OTHER PUBLICATIONS

B. D. Cullity, "Elements of X-ray Diffraction", 2nd Ed., Addison-Wesley Publishing Company, Inc., pp. 100-103.

(Continued)

*Primary Examiner*—Mark Kopec
(74) *Attorney, Agent, or Firm*—Fitzpatrick, Cella, Harper & Scinto

(57) ABSTRACT

There are provided an electrode material for a lithium secondary battery which comprises alloy particles comprising silicon as a major component and having an average particle diameter of 0.02 μm to 5 μm, wherein the size of a crystallite of the alloy is not less than 2 nm but no more than 500 nm and an intermetallic compound containing at least tin is dispersed in a silicon phase and an electrode material for a lithium secondary battery which comprises alloy particles comprising silicon as a major component and having an average particle diameter of 0.02 μm to 5 μm, wherein the size of a crystallite of the alloy is not less than 2 nm but no more than 500 nm and an at least one intermetallic compound containing at least one element selected from the group consisting of aluminum, zinc, indium, antimony, bismuth and lead is dispersed in a silicon phase. Thereby, an electrode material for a lithium secondary battery, an electrode structure comprising the electrode material and a secondary battery comprising the electrode structure are provided in which a drop in capacity due to repeated charging/discharging is small, and the charge/discharge cycle life is improved.

7 Claims, 11 Drawing Sheets

U.S. PATENT DOCUMENTS

| | | | |
|---|---|---|---|
| 7,141,187 B2 * | 11/2006 | Kosuzu et al. | 252/521.3 |
| 2002/0055041 A1 | 5/2002 | Kobayashi et al. | 429/221 |
| 2003/0157407 A1 | 8/2003 | Kosuzu | 429/231.95 |
| 2003/0175589 A1 * | 9/2003 | Kaminaka et al. | 429/218.1 |
| 2004/0191630 A1 | 9/2004 | Kawamura et al. | 429/231.95 |

FOREIGN PATENT DOCUMENTS

| | | |
|---|---|---|
| EP | 0 690 517 A1 | 1/1996 |
| EP | 0 855 752 A2 | 7/1998 |
| EP | 0 883 199 A1 | 12/1998 |
| EP | 1 028 476 A1 | 8/2000 |
| EP | 1 033 767 A1 | 9/2000 |
| EP | 1 100 134 A1 | 5/2001 |
| JP | 11-283627 | 10/1999 |
| JP | 2000-215887 | 8/2000 |
| JP | 2000-311681 | 11/2000 |
| WO | WO 00/17949 | 3/2000 |

OTHER PUBLICATIONS

Diffraction: Real Samples, http://www.lam.stanford.edu/xlab/MatSci162_172/LectureNotes/04_Real%20Samples.pdf, pp. 1-55, visited Oct. 22, 2007.

5-Lecture notes for Clay Mineralogy, http://www.gly.uga.edu/schroeder/geol6550/CM05.html, pp. 1-8, visited Oct. 22, 2007.

B. D. Cullity, "Elements of X-ray Diffraction", 2$^{nd}$ Ed., Addison-Wesley Publishing Company, Inc., pp. 100-103, no pub date provided.

* cited by examiner 2.4 μm

ELECTRODE MATERIAL FOR LITHIUM SECONDARY BATTERY, ELECTRODE STRUCTURE COMPRISING THE ELECTRODE MATERIAL AND SECONDARY BATTERY COMPRISING THE ELECTRODE STRUCTURE

BACKGROUND OF THE INVENTION

1. Field of the Invention

The present invention relates to an electrode material for a lithium secondary battery that comprises a powder of particles comprising silicon as a major component, an electrode structure comprising the electrode material and a secondary battery comprising the electrode structure.

2. Related Background Art

Recently, it has been said that because the amount of $CO_2$ gas contained in the air is increasing, global warming may be occurring due to the greenhouse effect. Thermal power plants use fossil fuels to convert a thermal energy into an electric energy, however they exhaust a large amount of $CO_2$ gas, thereby making it difficult to newly construct thermal power plants. Accordingly, for effective use of an electric power generated in thermal power plants, the so-called load leveling approach has been proposed wherein an electric power generated at night, which is an excess power, may be stored in a household secondary battery or the like, whereby the stored electric power can be used during the daytime when electric power consumption increases.

In addition, the development of a high energy-density secondary battery has been demanded for electric vehicles that do not exhaust air pollutants such as $CO_x$, $NO_x$, and hydrocarbons. Further, the development of compact, lightweight, high performance secondary batteries is urgently demanded for applications in portable electrical equipment such as notebook personal computers, video cameras, digital cameras, mobile phones, PDAs (Personal Digital Assistant) or the like.

As such a lightweight, compact secondary battery, a rocking chair type battery referred to as "lithium ion battery" which, during a charging reaction, uses a lithium intercalation compound as a positive electrode substance for allowing lithium ions to be deintercalated from between layers thereof and uses a carbonaceous material represented by graphite as a negative electrode substance for allowing lithium ions to be intercalated between planar layers of a 6-membered network-structure formed of carbon atoms have been developed and partly put into practical use.

However, with this "lithium ion battery", because the negative electrode formed of a carbonaceous material can theoretically intercalate only a maximum of ⅙ of a lithium atom per one carbon atom, a high energy-density secondary battery comparable with a lithium primary battery when using metallic lithium as a negative electrode material has not been realized.

If an amount of lithium more than the theoretical amount is tried to be intercalated in a negative electrode comprising carbon of a "lithium ion battery" during charging or charging is performed under a high current density condition, there is a possibility that lithium metal may grow in a dendrite shape on the carbon negative electrode surface, resulting in an internal short-circuit between the negative and the positive electrodes due to repeated charge/discharge cycles, so that any "lithium ion battery" which has a capacity more than the theoretical capacity of a graphite negative electrode has not provided a sufficient cycle life.

On the other hand, a high-capacity lithium secondary battery that uses metal lithium for a negative electrode has been drawing attention but not put in practical use yet.

This is because the charge/discharge cycle life is very short. This short charge/discharge cycle life is considered to be ascribed to the fact that metal lithium reacts with impurities such as water or organic solvents contained in the electrolyte to form an insulating film or that the surface of a metallic lithium foil is not flat and has a portion at which an electric field is concentrated, whereby repeated charging/discharging causes lithium to grow in a dendrite shape, resulting in an internal short-circuit between the negative and positive electrodes, thereby leading to the end of the battery life.

In order to suppress the progress of the reaction in which metal lithium reacts with water or organic solvents contained in the electrolyte, which is a problem peculiar to the secondary battery using a metal lithium negative electrode, a method which uses a lithium alloy containing lithium, aluminum and the like as a negative electrode has been proposed.

However, this method is not currently in wide practical use because the lithium alloy is too hard to wind in a spiral form, and therefore a spiral-wound type cylindrical battery cannot be made, because the cycle life is not sufficiently long, and because an energy density comparable to that of a battery using metal lithium for a negative electrode cannot sufficiently be obtained.

In order to resolve the above-mentioned problems, heretofore, U.S. Pat. Nos. 6,051,340, 5,795,679, and 6,432,585, Japanese Patent Application Laid-Open Nos. 11-283627 and 2000-311681 and International Publication WO 00/17949 have proposed a secondary battery that uses a negative electrode for a lithium secondary battery comprised of elemental tin or silicon.

U.S. Pat. No. 6,051,340 has proposed a lithium secondary battery that uses a negative electrode comprising an electrode layer formed of a metal that is alloyable with lithium such as silicon or tin and a metal that is not alloyable with lithium on a current collector of a metal material that is not alloyable with lithium.

U.S. Pat. No. 5,795,679 proposes a lithium secondary battery using a negative electrode formed of a powder of an alloy of an element such as nickel or copper with an element such as tin. U.S. Pat. No. 6,432,585 proposes a lithium secondary battery that uses a negative electrode with an electrode material layer containing 35% or more by weight of particles comprised of silicon or tin with a average particle diameter of 0.5 to 60 μm and having a void ratio of 0.10 to 0.86 and a density of 1.00 to 6.56 $g/cm^3$.

Japanese Patent Application Laid-Open No. 11-283627 proposes a lithium secondary battery that uses a negative electrode comprising silicon or tin having an amorphous phase; Japanese Patent Application Laid-Open No. 2000-311681 proposes a lithium secondary battery that uses a negative electrode comprising amorphous tin-transition metal alloy particles with a non-stoichiometric composition; and International Publication WO 00/17949 proposes a lithium secondary battery using a negative electrode comprising amorphous silicon-transition metal alloy particles with a non-stoichiometric composition.

However, in the lithium secondary batteries according to the above-mentioned proposals, the efficiency of the electricity amount involved in lithium release relative to the electricity amount involved in a first lithium insertion does not reach the same level of performance as a graphite negative electrode, so that further improvement in the efficiency have been expected. In addition, since the resistances of the electrodes of the lithium secondary batteries of the above proposals are higher than that of a graphite electrode, lowering in resistance has been desired.

Japanese Patent Application Laid-Open No. 2000-215887 proposes a high-capacity, high charging/discharging efficiency lithium secondary battery in which a carbon layer is formed on the surface of particles of a metal or semi-metal which is alloyable with lithium, in particular silicon particles, through chemical vapor disposition using thermal decomposition of benzene or the like to improve electrical conductivity, thereby suppressing volume expansion when alloying with lithium to prevent breakage of an electrode.

However, with this lithium secondary battery, while the theoretical charge capacity calculated for $Li_{4.4}Si$ as a silicon/lithium compound is 4200 mAh/g, an electrode performance allowing lithium insertion/release of an electricity amount exceeding 1000 mAh/g has not been attained, so that development of a high-capacity, long life negative electrode has been desired.

SUMMARY OF THE INVENTION

The present invention has been accomplished in view of the aforementioned problems, and it is an object of the present invention to provide an electrode material for a lithium secondary battery in which capacity drop due to repeated charging/discharging is small, and charge/discharge cycle life is improved, an electrode structure comprising the electrode material, and a secondary battery comprising the electrode structure.

A first aspect of the present invention is an electrode material for a lithium secondary battery comprising alloy particles comprising silicon as a major component and having an average particle diameter of 0.02 µm to 5 µu, wherein the size of a crystallite of the alloy is not less than 2 nm but no more than 500 nm and an intermetallic compound containing at least tin is dispersed in a silicon phase (First Invention).

A second aspect of the present invention is an electrode material for a lithium secondary battery comprising alloy particles comprising silicon as a major component and having an average particle diameter of 0.02 µm to 5 µm, wherein the size of a crystallite of the alloy is not less than 2 nm but no more than 500 nm and an at least one intermetallic compound containing at least one element selected from the group consisting of aluminum, zinc, indium, antimony, bismuth and lead is dispersed in a silicon phase.

DESCRIPTION OF THE PREFERRED EMBODIMENTS

Hereinafter, embodiments of the present invention will be explained with reference to the drawings.

The present inventors have previously found that by adding tin or copper to silicon and using a fine powder wherein the average particle diameter of alloy particles comprising 50% or more by weight of silicon element is not less than 0.1 µm but no more than 2.5 µm, a high-capacity lithium secondary battery can be manufactured.

The present inventors have newly found that with an electrode material in which an intermetallic compound comprising tin or at least one intermetallic compound comprising at least one element selected from the group consisting of aluminum, zinc, indium, antimony, bismuth and lead is dispersed in a silicon phase having a crystallite size of not less than 2 nm and not more than 500 nm, the capacity drop due to repeated charging/discharging can further be reduced and the charge/discharge cycle life can be improved, to accomplish the present invention.

Figure 1:
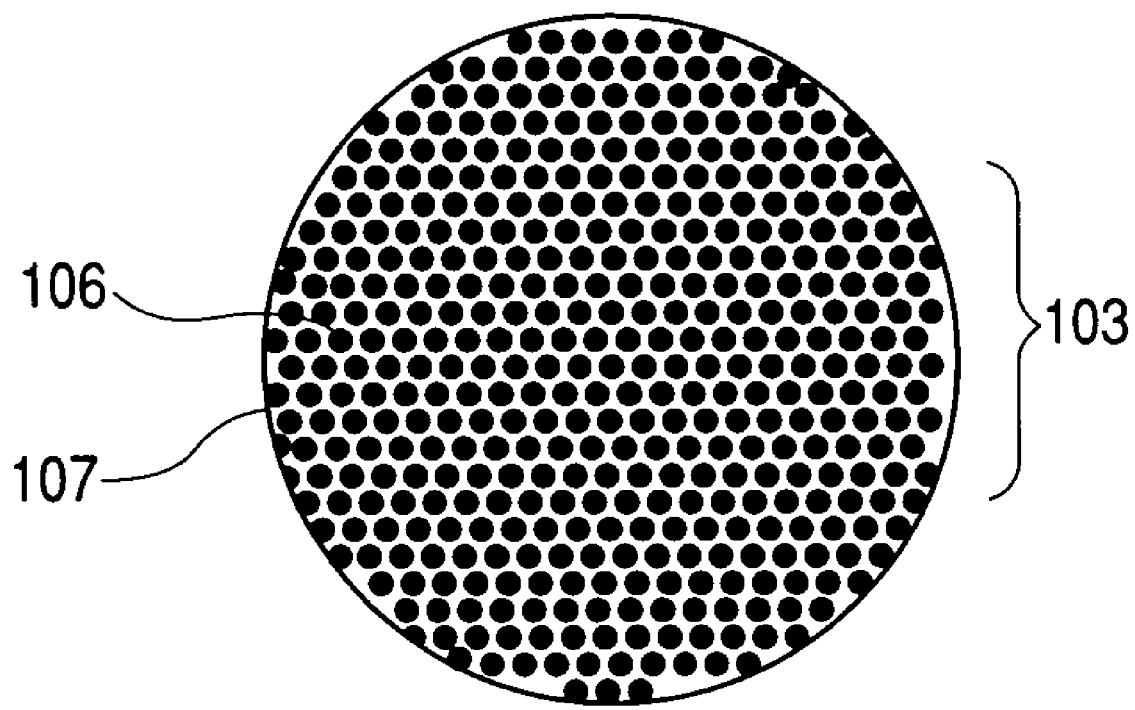
FIG. 1 is a schematic sectional view of a particle of an electrode material constituting the electrode material structure according to the present invention.

FIG. 1 is a schematic sectional view of a particle of an electrode material that constitutes an electrode structure according to the present invention, in which reference numeral 103 denotes a particle of the electrode material (active material) comprising silicon as a major component according to the present invention. The average particle diameter of this electrode material particle 103 is 0.02 µm to 5 µm. Further, this electrode material particle 103 is comprised of a silicon phase 106 and an intermetallic compound 107 which contains tin or an element selected from the group consisting of aluminum, zinc, indium, antimony, bismuth and lead.

That is, the electrode material 103 of the present invention is characterized in that an intermetallic compound 107 comprising tin or an intermetallic compound 107 comprising an element selected from the group consisting of aluminum, zinc, indium, antimony, bismuth and lead is disperses in a silicon phase having a crystallite size of 2 nm or more and 500 nm or less. Here, in addition to the intermetallic compound 107, tin or the element selected from the group consisting of aluminum, zinc, indium, antimony, bismuth and lead may also be present in an elemental metal state.

The state "intermetallic compound 107 is dispersed in silicon phase 106" referred to herein is not intended to mean that the powder particle is formed in a state of segregation in which the silicon phase 106 and a phase of the intermetallic compound 107 are separated from each other but is intended to mean the state such that the major component of the powder particle is silicon and the intermetallic compound 107 is present as a mixture therein. Further, such a state can be observed by means of transmission electron microscope or selected-area electron diffraction.

Elements that can form an intermetallic compound with tin are preferably copper, nickel, cobalt, iron, manganese, vanadium, molybdenum, niobium, tantalum, titanium, zircon, yttrium, lanthanum, selenium, magnesium and silver. Of those, copper, nickel and cobalt are more preferable. With tin these form intermetallic compounds such as $Cu_{41}Sn_{11}$, $Cu_{10}Sn_3$, $Cu_5Sn_4$, $Cu_5Sn$, $Cu_3Sn$, $Ni_3Sn_4$, $Ni_3Sn_2$, $Ni_3Sn$, $CO_3Sn_2$, $CoSn_2$, $CoSn$, $Fe_5Sn_3$, $Fe_3Sn_2$, $FeSn_2$, $FeSn$, $Mn_3Sn$, $Mn_2Sn$, $MnSn_2$, $Sn_3V_2$, $SnV_3$, $Mo_3Sn$, $Mo_2Sn_3$, $MoSn_2$, $NbSn_2$, $Nb_6Sn_5$, $Nb_3Sn$, $SnTa_3$, $Sn_3Ta_2$, $SnTi_2$, $SnTi_3$, $Sn_3Ti_5$, $Sn_5Ti_6$, $SnZr_4$, $Sn_2Zr$, $Sn_3Zr_5$, $Sn_2Y$, $Sn_3Y$, $Sn_3Y_5$, $Sn_4Y_5$, $Sn_{10}Y_{11}$, $LaSn$, $LaSn_3$, $La_2Sn_3$, $La_3Sn$, $La_3Sn_5$, $La_5Sn_3$, $La_5Sn_4$, $La_{11}Sn_{10}$, $Ce_3Sn$, $Ce_5Sn_3$, $Ce_5Sn_4$, $Ce_{11}Sn_{10}$, $Ce_3Sn_5$, $Ce_3Sn_7$, $Ce_2Sn_5$, $CeSn_3$, $Mg_2Sn$, $Ag_3Sn$, and $Ag_7Sn$.

Meanwhile, when silicon is used as an electrode material, because the volume change at the time of the reaction of insertion into silicon and release from silicon of lithium involved in charging/discharging is large, the crystalline structure of silicon will rupture to convert the particles into a fine powder, so that the charging/discharging becomes unable to be performed.

Therefore, the present inventors have previously found that by using amorphized silicon, or a fine powder of a silicon alloy, the cycle life can be improved, and further found that by dispersing in a silicon phase an intermetallic compound comprising tin, or an intermetallic compound comprising an element selected from the group consisting of aluminum, zinc, indium, antimony, bismuth and lead, lithium can be uniformly inserted into the silicon phase, thereby improving the cycle life.

Explaining this by taking a case of tin as one example, the electric potential E1 (Li/Li$^+$) of the electrochemical oxidation/reduction reaction (1) of lithium to tin is nobler than the electric potential E2 (Li/Li$^+$) of the oxidation/reduction reaction (2) of lithium to silicon.

  (1)

  (2)

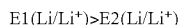

Here, since the lithium insertion reaction involved in charging begins from the nobler potential side, it is considered that the lithium insertion begins with tin followed by silicon. Therefore, it is considered that by uniformly dispersing tin in the silicon phase, the lithium insertion reaction into the silicon phase occurs uniformly, so that uniform incorporation of lithium into the silicon phase makes it possible to suppress the breakage of the crystalline structure of silicon.

Meanwhile, industrially convenient means for preparing an alloyed powder of silicon and tin include the so-called gas atomization method that performs alloying by atomizing a mixed and molten material, or the water atomization method. However, because there is a large difference in melting point such that while silicon has a melting point of 1412° C., tin has a melting point of 231.9° C., the alloy powder is liable to be formed in a state such that a silicon phase and a tin phase are separate from each other.

As means to suppress this, as shown in First Invention, it is effective to use an intermetallic compound comprising tin.

Specifically, when preparing the alloy, it is effective to adopt a method in which at least one element that forms an intermetallic compound with tin selected from the group consisting of copper, nickel, cobalt, iron, manganese, vanadium, molybdenum, niobium, tantalum, titanium, zirconium, yttrium, lanthanum, selenium, magnesium and silver is added, along with tin.

Here, because these intermetallic compounds have a higher melting point than that of tin, the difference in melting point from silicon can be made smaller, so that the tin phase and the alloy phase can uniformly be dispersed. Forming the intermetallic compound is also effective in suppressing the volume change when incorporating lithium.

Further, the elements of aluminum, zinc, indium, antimony, bismuth and lead can also electrochemically insert and release Li, and their oxidation/reduction reaction potentials for Li are nobler than that of silicon as is the case with tin. Further, the melting points of these elements, i.e., aluminum (660° C.), zinc (419.5° C.), indium (156.4° C.), antimony (630.5° C.), bismuth (271° C.) and lead (327.4° C.), are lower than that of silicon. Thus, as shown in Second Invention, by forming an intermetallic compound containing at least one of these elements to reduce the difference in melting point from silicon, uniform dispersion can be achieved.

These intermetallic compounds include $AlCu$, $AlCu_2$, $AlCu_3$, $Al_2Cu$, $Al_2Cu_3$, $Al_2Cu_7$, $Al_3Cu_7$, $Al_4Cu_5$, $CuZn$, $CuZn_{31}$, $CuZn_4$, $Cu_5Zn_8$, $Cu_2In$, $Cu_4In$, $Cu_7In_3$, $Cu_{11}In_9$, $Cu_2Sb$, $Cu_3Sb$, $Cu_4Sb$, $Cu_5Sb$, $Cu_{10}Sb_3$, $BiNi$, $Bi_3Ni$, $Bi_3Pb_7$ and $Pb_3Zr_5$.

The content of silicon in the alloy is preferably 50% or more by weight in order to exhibit the performance of a high chargeable amount as a lithium secondary battery negative electrode material. Further, the average particle diameter of the silicon alloy primary particles of the present invention is, as a lithium secondary battery negative electrode material, preferably within the range of 0.02 to 5.0 μM, and more preferably within the range of 0.05 to 1.0 μm so that the electrochemical lithium insertion/release reaction occurs rapidly and uniformly. The term "average particle diameter" used herein is intended to mean the average primary particle diameter (average particle diameter in an non-agglomerated state).

Here, if the above average particle diameter is too small, handling becomes less easy, the area of contact between particles when forming an electrode increases, thereby increasing the contact resistance. However, in the case of adopting the average particle diameter of the primary particles as mentioned above, making the particles larger by aggregating the primary particles leads to easier handling and lowering in the resistance.

In order to obtain a battery with a long life cycle, it is preferable that the crystalline structure of a ground fine powder contains an amorphous phase. Further, when a fine powder of a negative electrode material prepared by the method of producing a lithium secondary battery negative electrode material according to the present invention contains an amorphous phase, the volume expansion when alloying with lithium can be reduced.

Further, when the ratio of the amorphous phase becomes larger, the full width at half maximum of a peak of an X-ray diffraction chart, which is sharp for a crystalline material, widens, becoming broader. Incidentally, the full width at half maximum of a main peak of an X-ray diffraction chart of diffraction intensity for 2θ is preferably 0.10 or more, and more preferably 0.20 or more.

The size of the crystallite of the negative electrode material powder (powder of particles comprising silicon as a major component) prepared according to the present invention, in particular in a state in which the electrode structure has not been subjected to charging/discharging yet (i.e., in an unused state) is preferably controlled to be not less than 2 nm but no more than 500 nm, more preferably controlled to be not less than 2 nm but no more than 50 nm, and most preferably controlled to be not less than 2 nm but no more than 30 nm. By using such a fine crystalline powder, the electrochemical reaction during charging/discharging can be performed more smoothly, whereby the charging capacity can be improved. Further, the distortion caused by the insertion/release of lithium during charging/discharging can be minimized to increase the cycle life.

In the present invention, the crystallite size of the particles is determined using the following Scherrer equation on the basis of the full width at half maximum of a peak and the diffraction angle of an X-ray diffraction curve using CuKa as an radiation source.

Lc=0.94λ/(βcos θ) (Scherrer Equation)

Lc: crystallite size

λ: wavelength of X-ray beam

β: full width at half maximum of peak (radian)

θ: Bragg angle of diffracted rays

Meanwhile, methods for preparing the electrode material according to the present invention includes the following:

(A) A method wherein silicon, tin or aluminum, zinc, indium, antimony, bismuth, lead, a transition metal, or the like are mixed and molten and then subjected to atomization to form an alloy (e.g., gas atomization or water atomization method);

(B) A method wherein a silicon alloy ingot prepared by mixing and melting silicon, tin or aluminum, zinc, indium, antimony, bismuth, lead, a transition metal or the like is ground;

(C) A method wherein silicon powder, tin powder or a powder of aluminum, zinc, indium, antimony, bismuth, lead, a transition metal, or the like are ground and mixed in an inert gas atmosphere to form an alloy (mechanical alloying); and (D) A method wherein an alloy is formed from a gas phase by means of plasma, electron beam, laser or induction heating using a volatile chloride (or other halides), oxide or the like.

In addition, by mechanically grinding these alloyed powders, it becomes possible to uniformly disperse in a silicon phase an intermetallic compound comprising tin, or at least one intermetallic compound comprising at least one element selected from the group consisting of aluminum, zinc, indium, antimony, bismuth and lead.

Here, as the mechanical grinding apparatus, there are preferably used a ball mill such as a planetary ball mill, a vibrating ball mill, a conical mill and a tube mill; a media mill such as an attrition mill, a sand grinder, an annular mill and a tower mill. The material of the balls as the above grinding media is preferably zirconia, stainless steel or steel.

Incidentally, the grinding may be performed in either of a wet process or dry process. In wet grinding, the alloy powder is ground in a solvent or ground after a certain amount of solvent is added. The solvent used in wet grinding may be water or an organic solvent such as alcohol, hexane, etc. Examples of alcohol include methyl alcohol, ethyl alcohol, 1-propyl alcohol, 2-propyl alcohol, isopropyl alcohol, 1-butyl alcohol, 2-butyl alcohol and the like.

Figure 2A:
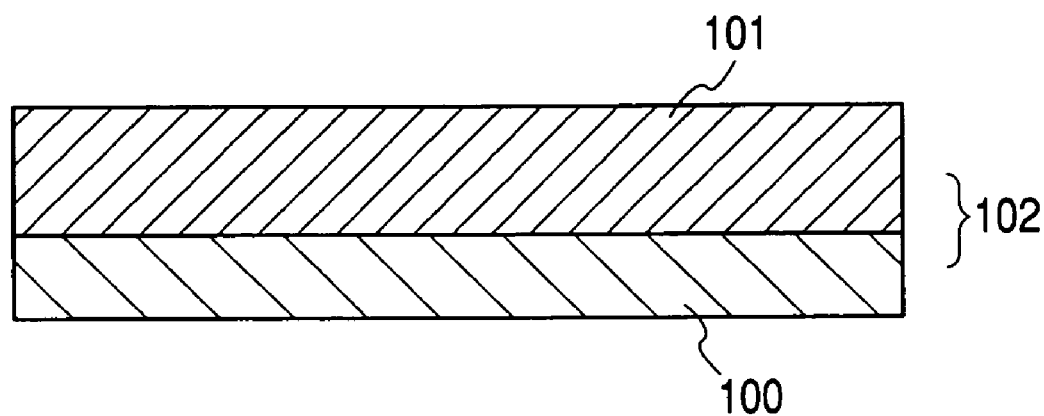
FIGS. 2A and 2B are conceptual views schematically illustrating sections of an electrode structure comprising the negative electrode material of the lithium secondary battery according to an embodiment of the present invention.
Figure 2B:
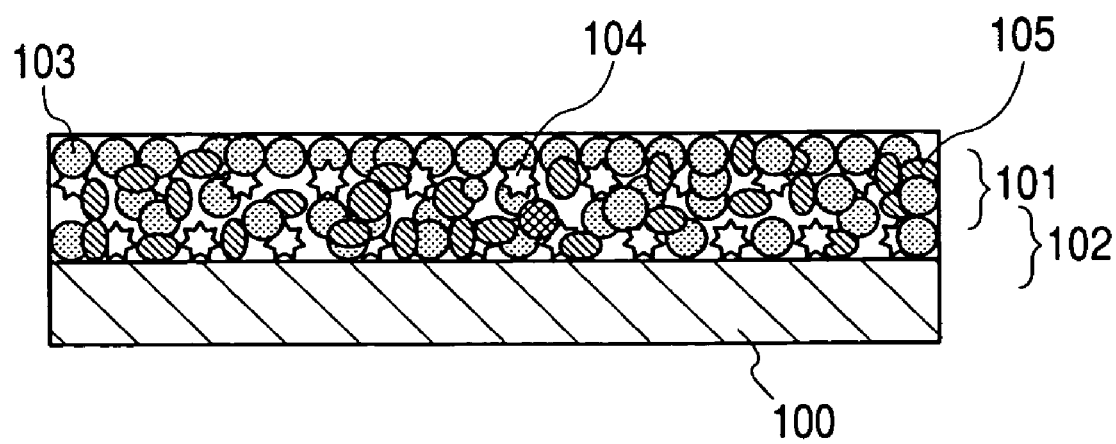

FIGS. 2A and 2B illustrate schematically sections of an electrode structure according to the present invention. In FIG. 2A, reference numeral 102 denotes an electrode structure. This electrode structure 102 is constituted of an electrode material layer 101 and a current collector 100. This electrode material layer 101 is constituted of, as illustrated in FIG. 2B, particles (active material) 103 comprising silicon as a major component, a conductive auxiliary material 104 and a binder 105. Incidentally, it should be noted that although in FIGS. 2A and 2B the electrode material layer 101 is provided only on one surface of the current collector 100, an electrode material layer may be formed on both sides of the current collector 100 respectively, depending on the battery configuration.

Here, the content of the conductive auxiliary material 104 is preferably not less than 5% by weight but no more than 40% by weight, and more preferably not less than 10% by weight but no more than 30% by weight. The content of the binder 105 is preferably not less than 2% by weight but no more than 20% by weight, and more preferably not less than 5% by weight but no more than 15% by weight. The content of the particles (powder) 103 comprising silicon as a major component in the electrode material 101 is preferably within the range of 40% by weight to 93% by weight.

The conductive auxiliary material 104 used includes carbonaceous materials such as amorphous carbons such as acetylene black and ketjenblack and graphite structure carbon, nickel, copper, silver, titanium, platinum, aluminium, cobalt, iron, chrome and the like, and especially graphite is preferable. The shape of the conductive auxiliary material may preferably be a shape selected from a spherical shape, a flake shape, a filament shape, a fiber shape, a spike shape, a needle shape, and the like. In addition, by employing two or more different shapes of powders, the packing density when forming the electrode material layer can be increased, thereby reducing the impedance of the electrode structure 102.

The material for the binder 105 may include a water-soluble polymer such as polyvinyl alcohol, water-soluble ethylene-vinyl alcohol copolymer, polyvinyl butyral, polyethylene glycol, sodium carboxymethyl cellulose and hydroxyethyl cellulose; a fluororesin such as polyvinylidene fluoride and vinylidene fluoride-hexafluoropropylene copolymer; a polyolefin such as polyethylene and polypropylene; styrene-butadiene rubber, polyamide-imide, polyimide, and polyamic acid (polyamide precursor). Of these, when a combination of polyvinyl alcohol and sodium carboxymethyl cellulose, polyamide-imide or polyamic acid (polyamide precursor) is used, the strength of the electrode increases, whereby an electrode with an excellent charge/discharge cycle characteristic can be manufactured.

In addition, because the current collector 100 has the role of efficiently supplying an electric current to be consumed by the electrode reaction during charging, or collecting an electric current generated during discharging, in particular when applying the electrode structure 102 to an negative electrode of a secondary battery, it is desirable that the current collector 100 is formed of a material that has a high electric conductivity and is inert to the battery reactions.

Preferable materials include at least one metallic material selected from the group consisting of copper, nickel, iron, stainless steel, titanium and platinum. A more preferable material is copper that is inexpensive and has a low electrical resistance.

Further, while the shape of the current collector 100 is a plate shape, this "plate shape" is, within the scope of practical use, not particularly limited in thickness, and encompasses the so-called "foil" shape having a thickness of about 100 µm or less. As the plate shape member, for example, a meshy, spongy or fibrous member, punching metal, or expanded metal can also be employed.

Now, a procedure for manufacturing the electrode structure 102 will be explained.

First, the conductive auxiliary material 104 and the binder 105 are mixed with a silicon alloy powder of the present invention, to which an appropriate amount of a solvent for the binder 105 is added, followed by kneading to prepare a paste. Then, the prepared paste is applied to the current collector 100 and dried to form the electrode material layer 101, and pressing is then effected to adjust the thickness and density of the electrode material layer 101 thus forming the electrode structure 102.

As the above-mentioned application method, a coater coating method or a screen printing method can be used. In addition, the above major component along with the conductive auxiliary material 104 and the binder 105, without addition of a solvent, or the above negative electrode material along with the conductive auxiliary material 104 alone, without addition of the binder 105, may be subject to pressure forming on the current collector to form the electrode material layer 101.

Here, if the density of the electrode material layer 101 is too large, the expansion at the time of lithium insertion becomes greater, so that peeling off of the electrode material layer 101 from the current collector 100 occurs, and if the density of the electrode material layer 101 is too small, the resistance of the electrode becomes greater, so that the lowering in charging/discharging efficiency and the drop in voltage of the battery at the time of discharging become greater. For these reasons, the density of the electrode material layer 101 according to the present invention is preferably within the range of 0.8 to 2.0 g/cm$^3$, and more preferably within the range of 0.9 to 1.5 g/cm$^3$.

Incidentally, an electrode structure 102 formed only of the silicon alloy particles of the present invention without using the conductive auxiliary material 104 and the binder 105 can be made by directly forming an electrode material layer 101 on the current collector 100 using a method such as sputtering, electron beam evaporation, cluster ion beam deposition, or the like.

However, in this case, if the electrode material layer 101 is thick, peeling off is liable to occur at the interface with the current collector 100, so that the above-mentioned direct formation is not suitable for formation of a thick electrode structure 102. Incidentally, in order to prevent the above peeling off, it is preferred that a metal layer or an oxide layer or a nitride layer is provided in a thickness of a nanometer order on the current collector 100 to form an unevenness in the surface of the current collector 100, thereby improving the adhesion at the interface. Examples of the oxide layer and nitride layer preferably include an oxide layer or nitride layer of silicon or a metal.

Meanwhile, the secondary battery according to the present invention comprises a negative electrode using the electrode structure as characterized above, an electrolyte and a positive electrode and utilizes an oxidation reaction of lithium and a reduction reaction of lithium ions.

Figure 3:
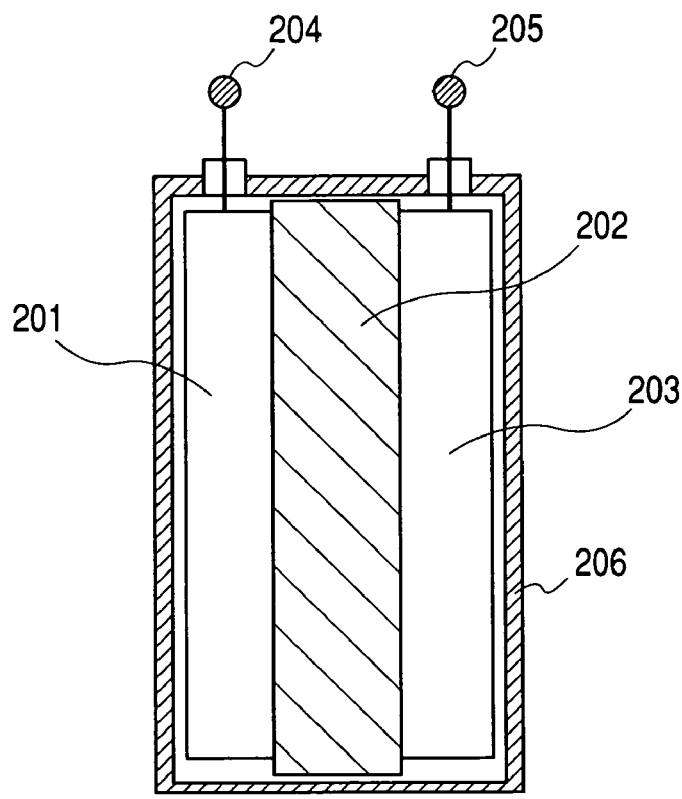
FIG. 3 is a conceptual view schematically illustrating a section of a secondary battery (lithium secondary battery) of an embodiment of the present invention.

FIG. 3 is a view schematically showing a basic structure of the lithium secondary battery according to the present invention, in which reference numeral 201 denotes a negative electrode using an electrode structure of the present invention, reference numeral 202 an ionic conductor, reference numeral 203 a positive electrode, reference numeral 204 a negative electrode terminal, reference numeral 205 a positive electrode terminal and reference numeral 206 a battery case (housing).

Here, the above secondary battery is assembled in such a way that the ionic conductor 202 is sandwiched and stacked between the negative electrode 201 and the positive electrode 203 to form an electrode group, then after this electrode group has been inserted into the battery case in dry air or a dry inert gas atmosphere in which the dew point is sufficiently controlled, the electrodes 201, 203 are contacted to the electrode terminals 204, 205, respectively and the battery case is sealed.

Incidentally, when using a member having an electrolyte held in a micro-porous plastic film as the ionic conductor 202, the battery is assembled by inserting a micro-porous plastic film between the negative electrode 201 and the positive electrode 203 as a separator to prevent short-circuiting to form an electrode group, then inserting the electrode group into the battery case, connecting the electrodes 201, 203 to the electrode terminals 204, 205, respectively, injecting the electrolyte and sealing the battery case.

The lithium secondary battery that uses an electrode structure comprising an electrode material of the present invention as the negative electrode has a high charging/discharging efficiency and capacity and a high energy density owing to the above-mentioned advantageous effects of the negative electrode.

Herein, the positive electrode 203, which is the counter electrode of the lithium secondary battery using the electrode structure of the present invention as the negative electrode, comprises a positive electrode material that is at least a lithium ion source and serves as a host material for lithium ions, and preferably comprises a layer formed of a positive electrode material that serves as a host material for lithium ions and a current collector. Further, it is preferable that the layer formed of the positive electrode material comprises the positive electrode material that serves as a host material for lithium ions and a binder, and a conductive auxiliary material as occasion demands.

As the positive electrode material that is a lithium ion source and serves as a host material used in the lithium secondary battery of the present invention, there are preferably included lithium-transition metal oxides, lithium-transition metal sulfides, lithium-transition metal nitrides and lithium-transition metal phosphates. The transition metal for the transition metal oxides, transition metal sulfides, transition metal nitrides or transition metal phosphates includes, for example, metal elements having a d-shell or f-shell, i.e., Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, and in particular Co, Ni, Mn, Fe, Cr, and Ti are preferably used.

Where the above positive electrode active material is a powder, the positive electrode is made by using a binder, or made by forming the positive electrode active material layer on the current collector by calcination or deposition. Further, when the conductivity of the powder of the positive electrode active material is low, it becomes necessary to suitably mix a conductive auxiliary material therewith as in the above-mentioned formation of the active material layer for the electrode structure. The conductive auxiliary materials and binders that may be used are the same as those mentioned above for the electrode structure 102 of the present invention.

The current collector material used for the positive electrode is preferably a material that has a high electrical conductivity and is inert to the battery reaction, such as aluminium, titanium, nickel and platinum. Specifically, nickel, stainless steel, titanium and aluminium are preferable, of which aluminium is more preferable because it is inexpensive and has a high electrical conductivity. Further, while the shape of the current collector is a plate shape, this "plate shape" is, within the scope of practical use, not particularly limited in thickness, and encompasses the so-called "foil" shape having a thickness of about 100 μm or less. As the plate shape member, for example, a meshy, spongy or fibrous member, punching metal, or expanded metal can also be employed In addition, as the ionic conductor 202 of the lithium secondary battery of the present invention, lithium ion conductors such as a separator holding an electrolyte solution (electrolyte solution prepared by dissolving an electrolyte in a solvent), a solid electrolyte, or a solidified electrolyte obtained by gelling an electrolyte solution with a polymer gel, a complex of a polymer gel and a solid electrolyte can be used. Here, the conductivity of the ionic conductor 202 at 25° C. is preferably $1 \times 10^{-3}$ S/cm or more, and more preferably $5 \times 10^{-3}$ S/cm or more.

As the electrolyte, there may be included salts comprised of lithium ions ($Li^+$) and Lewis acid ions ($BF_4^-$, $PF_6^-$, $AsF_6^-$, $ClO_4^-$, $CF_3SO_3^-$, or $BPh_4^-$ (Ph: phenyl group)) and mixtures thereof. It is preferable that the above salts have been previously subjected to sufficient dehydration and deoxidation by heating under a reduced pressure or the like.

As a solvent for the electrolyte, there may be included, for example, acetonitrile, benzonitrile, propylene carbonate, ethylene carbonate, dimethyl carbonate, diethyl carbonate, ethylmethyl carbonate, dimethyl formamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, methyl formate, 3-methyl-2-oxazolidinone, 2-methyltetrahydrofulan, 3-propylsydnone, sulfur dioxide, phosphoryl chloride, thionyl chloride, sulfuryl chloride or a liquid mixture thereof.

Incidentally, it is preferable to either dehydrate the above-mentioned solvent, for example, with activated alumina, a molecular sieve, phosphorus pentaoxide or calcium chloride, or depending on the solvent, to distill the solvent in an inert gas atmosphere in the presence of an alkaline metal for elimination of impurities and dehydration.

In order to prevent leakage of the electrolyte solution, it is preferable to use a solid electrolyte or a solidified electrolyte. The solid electrolyte may include a glass material such as an oxide material comprising lithium, silicon, oxygen, and phosphorus or sulfur elements, a polymer complex of an organic polymer having an ether structure. The solidified electrolyte is preferably obtained by gelling the above electrolyte solution with a gelling agent to solidify the electrolyte solution.

It is desirable to use as the gelling agent a polymer that can absorb the solvent of the electrolyte solution to swell, or a porous material capable of absorbing a large amount of liquid, such as silica gel. As the polymer, there may be used polyethylene oxide, polyvinyl alcohol, polyacrylonitrile, polymethylmethacrylate, vinylidenefluoride-hexafluoropropylene copolymer, and the like. Further, it is more preferred that the polymers have a cross-linking structure.

The ionic conductor 202 constituting the separator which plays the role of preventing short-circuiting between the negative electrode 201 and the positive electrode 203 in the secondary battery may also have a role of retaining the electrolyte solution and is required to have a large number of fine pores through which lithium ions can pass and to be insoluble and stable in the electrolyte solution.

Accordingly, as the material of the ionic conductor 202 (separator), there are preferably used, for example, a material of a micropore structure made of glass, a polydlefin such as polypropylene or polyethylene, a fluororesin, etc., or a nonwoven fabric. Alternatively, a metal oxide film having micropores or a resin film complexed with a metal oxide may also be used.

Now, the shape and structure of the secondary battery will be explained.

The specific shape of the secondary battery according to the present invention may be, for example, a flat shape, a cylindrical shape, a rectangular parallelepiped shape, a sheet shape or the like. The structure of the battery may be, for example, a single layer type, a multiple layer type, a spiral-wound type or the like. Of those, a spiral-wound type cylindrical battery permits an enlarged electrode surface area by rolling a separator that is sandwiched between a negative electrode and a positive electrode, thereby being capable of supplying a large current at the time of charging/discharging. Furthermore, batteries having a rectangular parallelepiped shape or sheet shape permit effective utilization of accommodation space in appliances that will be configured by accommodating a plurality of batteries therein.

Figure 4:
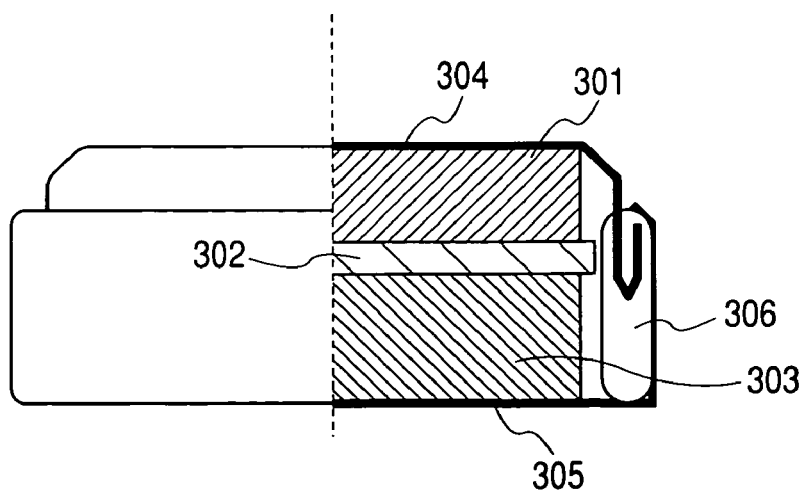
FIG. 4 is a cross-sectional view of a single layer, flat type (coin type) battery.
Figure 5:
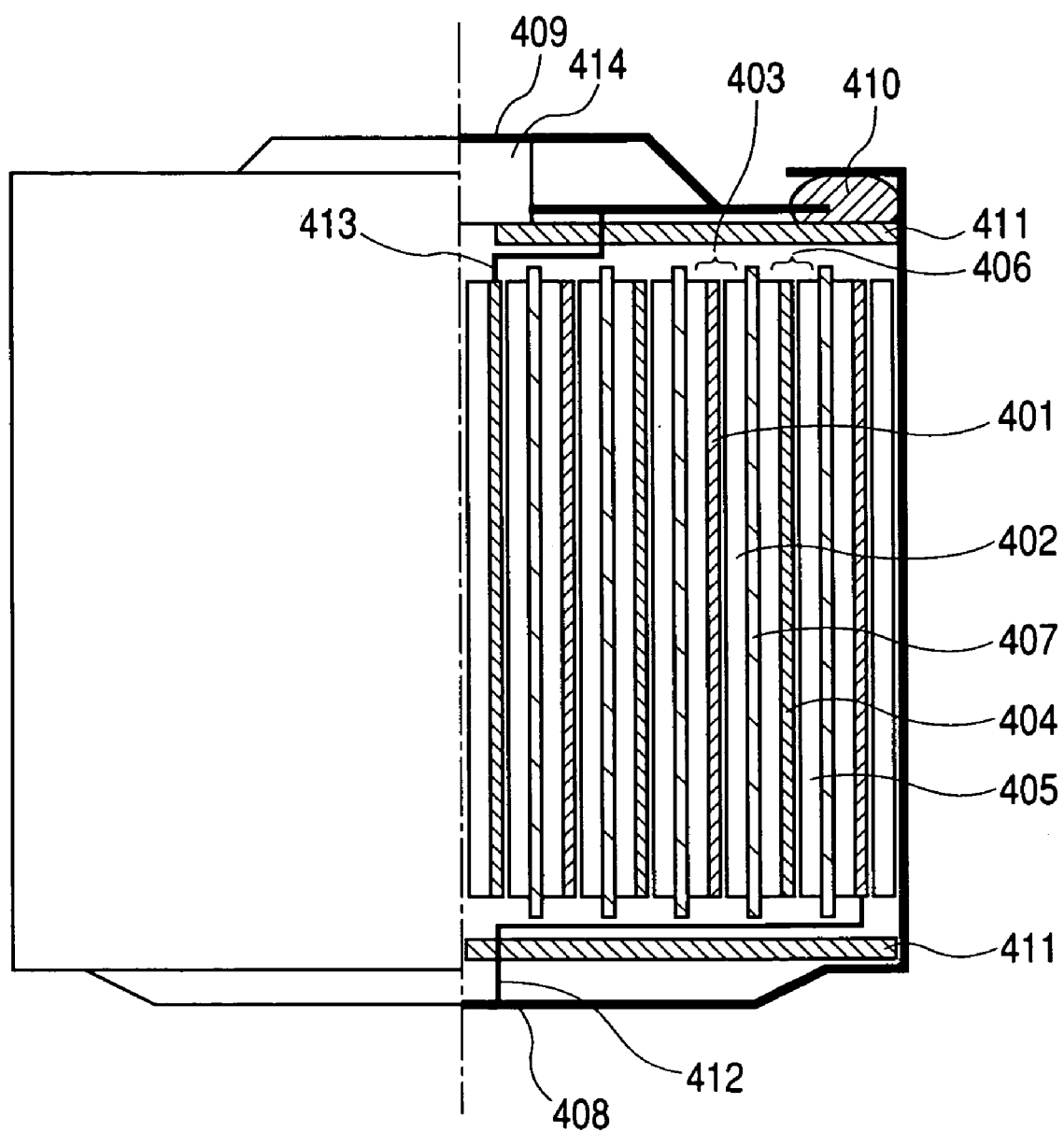
FIG. 5 is a cross-sectional view of a spiral-wound type cylindrical battery.

Now, description will be made in more detail of the shape and structure of the battery with reference to FIGS. 4 and 5. FIG. 4 is a sectional view of a single layer type flat (i.e., coin type) battery and FIG. 5 is a sectional view of a spiral-wound type cylindrical battery. These lithium secondary batteries generally comprise the same structure as that illustrated in FIG. 3, a negative electrode, a positive electrode, an electrolyte, an ionic conductor, a battery housing and an output terminal.

In FIGS. 4 and 5, reference numerals 301, 403 denote negative electrodes, reference numerals 303, 406 positive electrodes, reference numerals 304, 408 negative electrode caps or negative electrode cans as negative electrode terminals, reference numerals 305, 409 positive electrode caps or positive electrode cans as positive electrode terminals, reference numeral 302, 407 ionic conductors, reference numerals 306, 410 gaskets, reference numeral 401 represents a negative electrode current collector, reference numeral 404 a positive electrode current collector, reference numeral 411 an insulating plate, reference numeral 412 a negative electrode lead, reference numeral 413 a positive electrode lead, and reference numeral 414 a safety valve.

In the flat secondary battery (coin type) shown in FIG. 4, the positive electrode 303 that contains a positive electrode material layer and the negative electrode 301 that contains a negative electrode material layer are stacked with an ionic conductor 302 which is formed by a separator that retains at least an electrolyte solution therein, wherein the stack is accommodated from the positive electrode side into the positive electrode can 305 used as a positive terminal and the negative electrode is covered with the negative electrode cap 304 used as a negative electrode. A gasket 306 is provided in the remaining portions of the positive electrode can.

In the spiral-wound type cylindrical secondary battery shown in FIG. 5, the positive electrode 406 having a positive electrode (material) layer 405 formed on the positive electrode current collector 404 and the negative electrode 403 having the negative electrode (material) layer 402 formed on the negative electrode current collector 401 are provided in opposition to each other via the ionic conductor 407 formed by a separator that retains at least an electrolyte solution therein so as to form a stack of a cylindrical structure rolled up multiple times.

The cylindrical stack is accommodated in the negative electrode can 408 used as the negative electrode terminal. Furthermore, the positive electrode cap 409 is disposed as the positive electrode terminal on a side of an opening of the negative electrode can 408 and a gasket 410 is disposed in the remaining parts of the negative electrode can. The cylindrical electrode stack is isolated from the positive electrode cap side by the insulating plate 411.

The positive electrode 406 is connected to the positive electrode cap 409 by way of the positive electrode lead 413. The negative electrode 403 is connected to the negative electrode cap 408 by way of the negative electrode lead 412. The safety valve 414 is disposed on the side of the positive electrode cap to adjust the internal pressure of the battery. As mentioned above, a layer comprising the above negative electrode material fine powder of the present invention is used as the active material layer 402 of the negative electrode 403.

Next, an example of assembling procedures for the battery shown in FIGS. 4 and 5 will be described. (1) The ionic conductor 302, 407 as a separator is sandwiched between the negative electrode 301, 403 and the formed positive electrode 303, 406, and assembled into the positive electrode can 305 or the negative electrode can 408.

(2) After injection of the electrolyte solution, the negative electrode cap 304 or the positive electrode cap 409 is assembled with the gasket 306, 410.

(3) The assembly obtained in (2) above is caulked.

The battery is completed in this way. Incidentally, it is preferable that the above-described preparation of the materials for the lithium battery and assembly of the battery is carried out in dry air from which moisture has been removed sufficiently or in a dry inert gas.

Next, members comprising the secondary battery will be described.

As the material of the gasket 306, 410, there may be used, for example, a fluororesin, a polyolefin resin, a polyamide resin, a polysulfone resin, or a rubber material. The sealing of the battery may be conducted by way of glass-sealing, sealing using an adhesive, welding or soldering, besides the caulking using the insulating packing shown in FIG. 4 or 5. As the material of the insulating plate 411 shown in FIG. 4, organic resin materials and ceramics may be used.

The battery housing is constituted of the positive electrode can 305 or the negative electrode can 408, and the negative electrode cap 304 or the positive electrode cap 409. As the material of the battery housing, stainless steel is preferably used. Further, as other materials of the battery housing, there are frequently used an aluminum alloy, a titanium clad stainless steel, a copper clad stainless steel or a nickel-plated steel.

The positive electrode can 305 illustrated in FIG. 4 and the negative electrode can 408 illustrated in FIG. 5 function as the battery housing (case) and also as a terminal and is therefore preferably made of stainless steel. However, where the positive electrode 305 or the negative electrode 408 does not function as both the battery housing (case) and the terminal, in addition to stainless steel, a metal such as zinc, a plastic such as polypropylene, a composite material of a metal or glass fibers and a plastic may be used.

As the safety valve 414 provided in the lithium secondary battery in order to ensure safety when the internal pressure in the battery is increased, for example, rubber, a spring, a metal ball or a rupture disk may be used.

EXAMPLES

In the following, the present invention will be described in more detail with reference to examples.

(Preparation of Electrode Material)

First, examples for the preparation of a negative electrode material will be explained.

Example 1

65% by weight of Si, 30% by weight of Sn and 5% by weight of Cu were melted and mixed to make an alloy, which was subjected to water atomization to prepared a Si—Sn—Cu alloy powder having an average particle diameter of 10 µm. Next, the prepared alloy-powder was ground with a bead mill (ball mill using beads with comparatively small diameter as grinding media) to obtain a Si—Sn—Cu alloy fine powder. This grinding was performed using zirconia beads in isopropyl alcohol.

Then, processing for 2 hours in a high-energy planetary-type ball mill in an argon gas atmosphere using balls made of silicon nitride provided an electrode material of Si—Sn—Cu alloy fine powder.

Example 2

An electrode material of a Si—Zn—Cu alloy fine powder was obtained following the same procedure as Example 1 with the exception that an alloy with a composition of 70% by weight of Si, 25% by weight of Zn and 5% by weight of Cu was prepared by a gas atomization process using nitrogen gas.

Example 3

An electrode material of a Si—Sn—Co alloy fine powder was obtained following the same procedure as Example 1 with the exception that an alloy with a composition of 50% by weight of Si, 40% by weight of Sn and 10% by weight of Co was prepared by a water atomization process.

Example 4

An electrode material of a Si—Sn—Ni alloy fine powder was obtained following the same procedure as Example 1 with the exception that an alloy with a composition of 85% by weight of Si, 10% by weight of Sn and 5% by weight of Ni was prepared by a water atomization process.

Reference Example 1

An electrode material of a Si—Sn—Cu alloy fine powder was obtained following the same procedure as Example 1 with the exception that the processing in a high-energy planetary-type ball mill was not performed.

Reference Example 2

An electrode material of a Si—Zn—Cu alloy fine powder was obtained following the same procedure as Example 2 with the exception that the processing in a high-energy planetary-type ball mill was not performed.

Reference Example 3

An electrode material of a Si—Sn—Co alloy fine powder was obtained following the same procedure as Example 3 with the exception that the processing in a high-energy planetary-type ball mill was not performed.

Reference Example 4

An electrode material of a Si—Sn—Ni alloy fine powder was obtained following the same procedure as Example 4 with the exception that the processing in a high-energy planetary-type ball mill was not performed.

Next, the results of analyzing the electrode materials obtained in Examples 1 to 4 and Reference Examples 1 to 4 will be explained.

The above Si alloy electrode materials were analyzed from the viewpoint of factors that are considered to affect the performance of a negative electrode of a lithium secondary battery, such as average particle diameter, crystallite size, intermetallic compounds of Sn or Zn, and distribution of elements in the alloy.

Here, the average particle diameter was determined by a laser diffraction/scattering particle size distribution analyzer, and further observed with a scanning electron microscope (SEM). Further, the crystallite size was calculated from the full width at half maximum of an X-ray diffraction peak in accordance with the Scherrer equation, and detection of Sn or Zn intermetallic compounds was performed by investigation using the selected-area electron diffraction.

Further, the distribution of elements in the alloy was investigated by TEM observation in terms of nonuniformity in color density within the alloy particle. Incidentally, when the localization of elements in the alloy is small and the elements are uniformly dispersed, an image with less nonuniformity in color density within the alloy particle is observed, and in elemental mapping by the energy dispersive X-ray spectroscopy (EDXS) combined with TEM, less localization of elemental distribution within the particle is observed.

Figure 6:
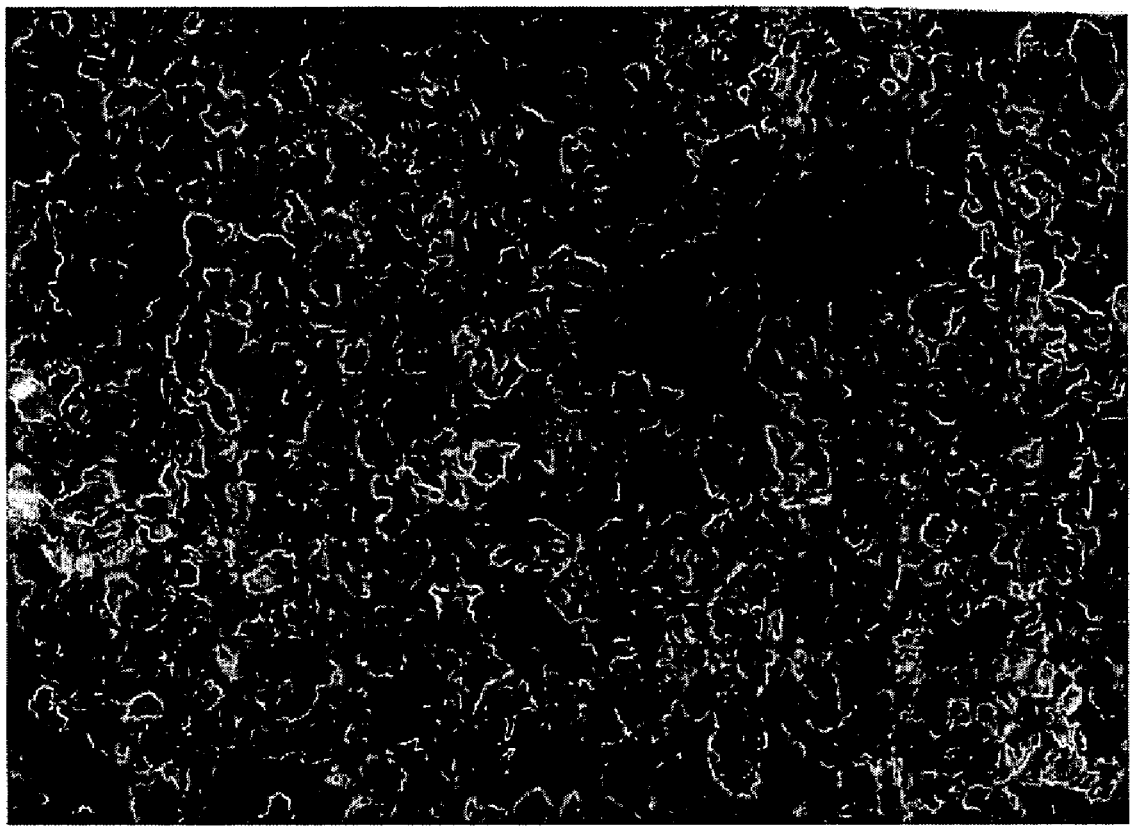
FIG. 6 is a scanning electron microscope photograph of the electrode material prepared in Example 1 of the present invention.

The electrode material made in Example 1 was measured for particle size distribution with a laser diffraction/scattering particle size distribution analyzer (model: LA-920 manufactured by Horiba Ltd.), with the result that the median diameter was 0.28 μm. FIG. 6 is a photograph of the electrode material obtained by SEM observation, from which it was seen that the electrode material (negative electrode material) were uniform particles of 0.5 μm or less.

Figure 7:
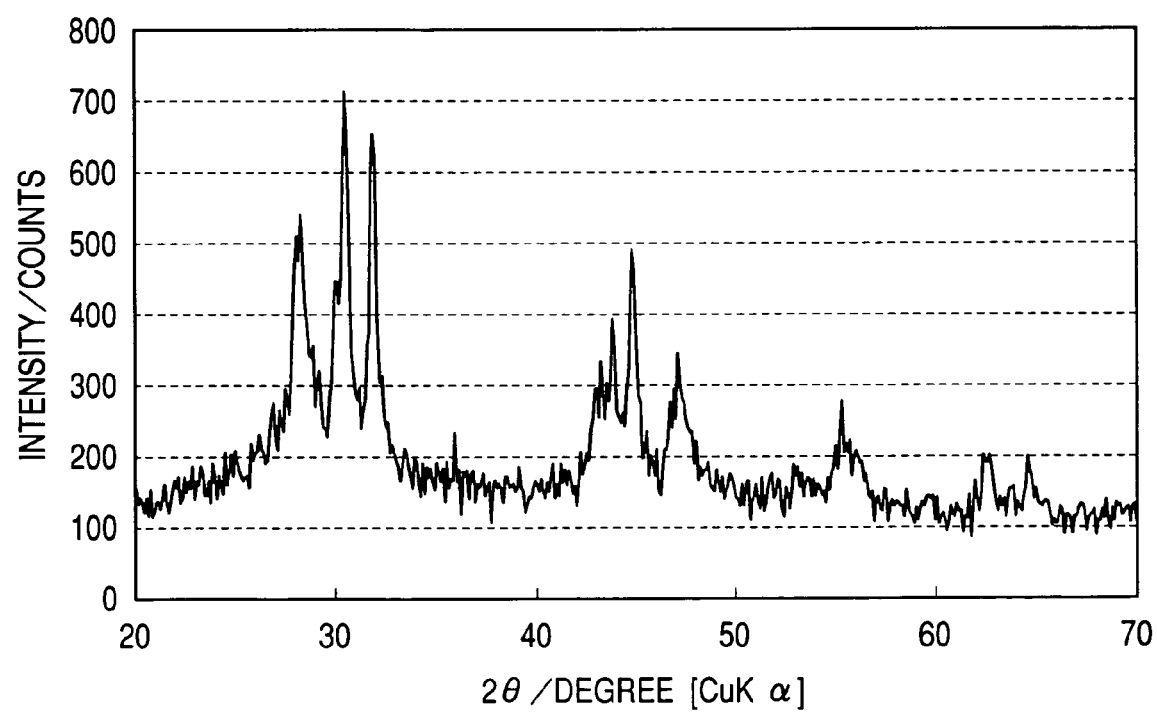
FIG. 7 is a view illustrating an X-ray diffraction profile of the electrode material prepared in Example 1 of the present invention.

In addition, X-ray diffraction measurement was carried out to obtain the profile of FIG. 7. The crystallite size calculated from the Scherrer equation using the full width at half maximum of a peak at 28°±1 as a main peak of silicon was 11.1 nm.

Figure 8:
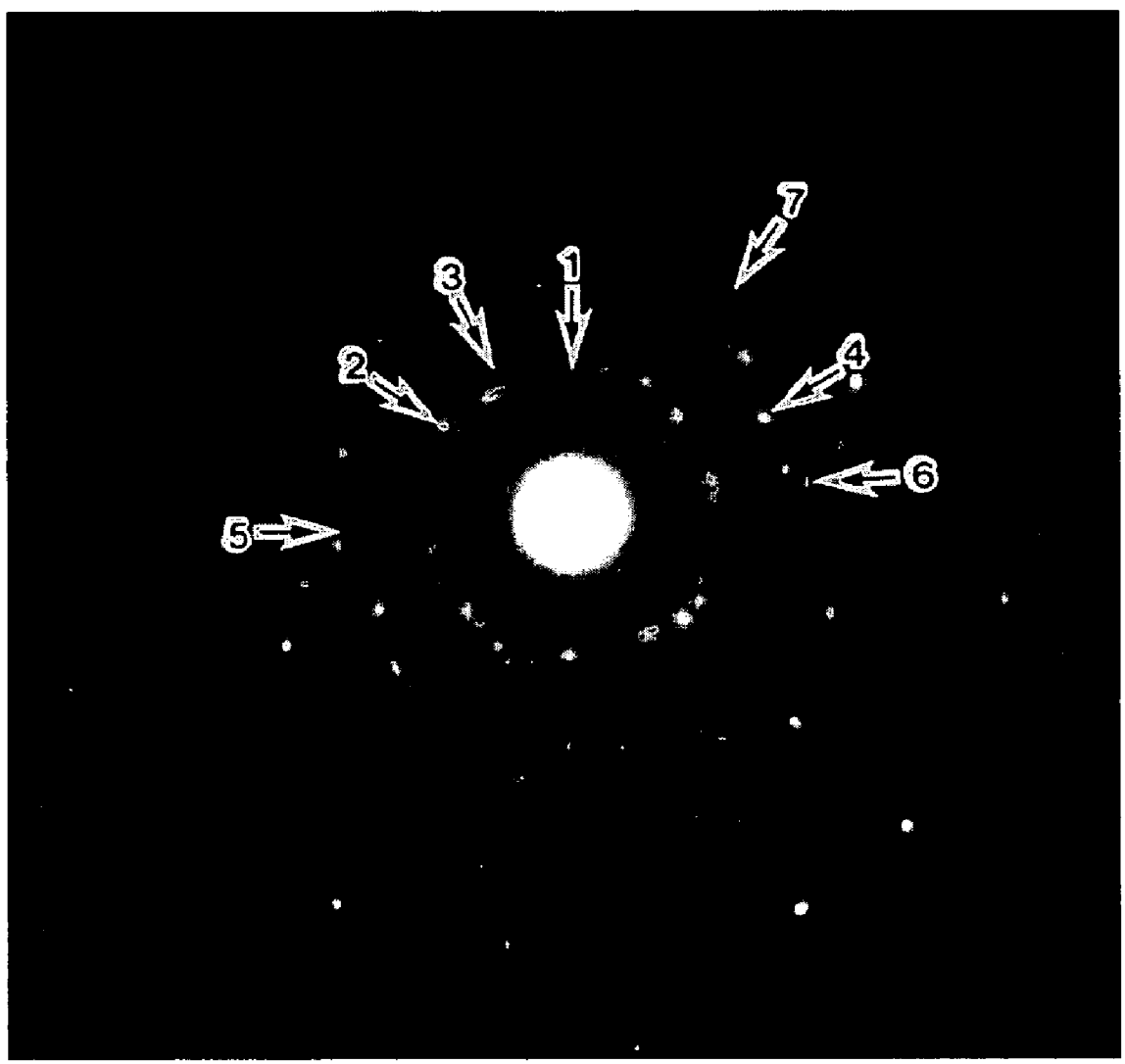
FIG. 8 is a view illustrating a selected-area electron diffraction image of the electrode material prepared in Example 1 of the present invention.

Further, electron diffraction was performed at a selected-area region of a diameter of 150 nm adopted in the TEM observation. The results are collectively shown in FIG. 8. Incidentally, as to the ring diffraction pattern of FIG. 8, the calculated d values are collectively shown in Table 1.

TABLE 1

| d value calculated from electron diffraction results of material made in Example 1 | d value of Si (JCPDS card number: 27-1402) | d value of $Cu_6Sn_5$ (JCPDS card number: 02-0713) |
|---|---|---|
| 3.13 | 3.14 | |
| 2.93 | | 2.96 |
| 2.55 | | 2.55 |
| 2.09 | | 2.09 |
| | | 2.08 |
| 1.90 | 1.92 | |
| | | 1.71 |
| 1.63 | | 1.62 |

Thus, it was seen from Table 1 that the d values calculated from the results of electron diffraction of the electrode material made in Example 1 were quite similar to the d values of the JCPDS card number for $Cu_6Sn_5$, which meant the presence of $Cu_6Sn_5$.

Further, Examples 2 to 4 were also investigated in the same manner as described above, and the average particle diameter, crystallite size, and observed intermetallic compounds of the electrode materials made in Example 1 to 4 are collectively shown in Table 2.

TABLE 2

| | | Average particle diameter (μm) | Crystallite size (nm) | Observed intermetallic compound |
|---|---|---|---|---|
| Example 1 | Si/Sn/Cu = 65/30/5 (weight ratio) | 0.28 | 11.1 | $Cu_6Sn_5$ |
| Example 2 | Si/Zn/Cu = 85/10/5 (weight ratio) | 0.24 | 11.3 | $Cu_5Zn_8$ |
| Example 3 | Si/Sn/Co = 50/40/10 (weight ratio) | 0.49 | 11.7 | CoSn, $Co_3Sn_2$, $Co_3Sn$ |
| Example 4 | Si/Sn/Ni = 85/10/5 (weight ratio) | 0.25 | 10.5 | $Ni_3Sn_2$ |

Thus, it was seen from Table 2 that for the Si alloys made in Examples 1 to 4, the average particle diameter was 0.24 to 0.49 μm, the crystallite size was 10.5 to 11.7 nm, and further that Sn intermetallic compounds or Zn intermetallic compounds were present.

Figure 9:
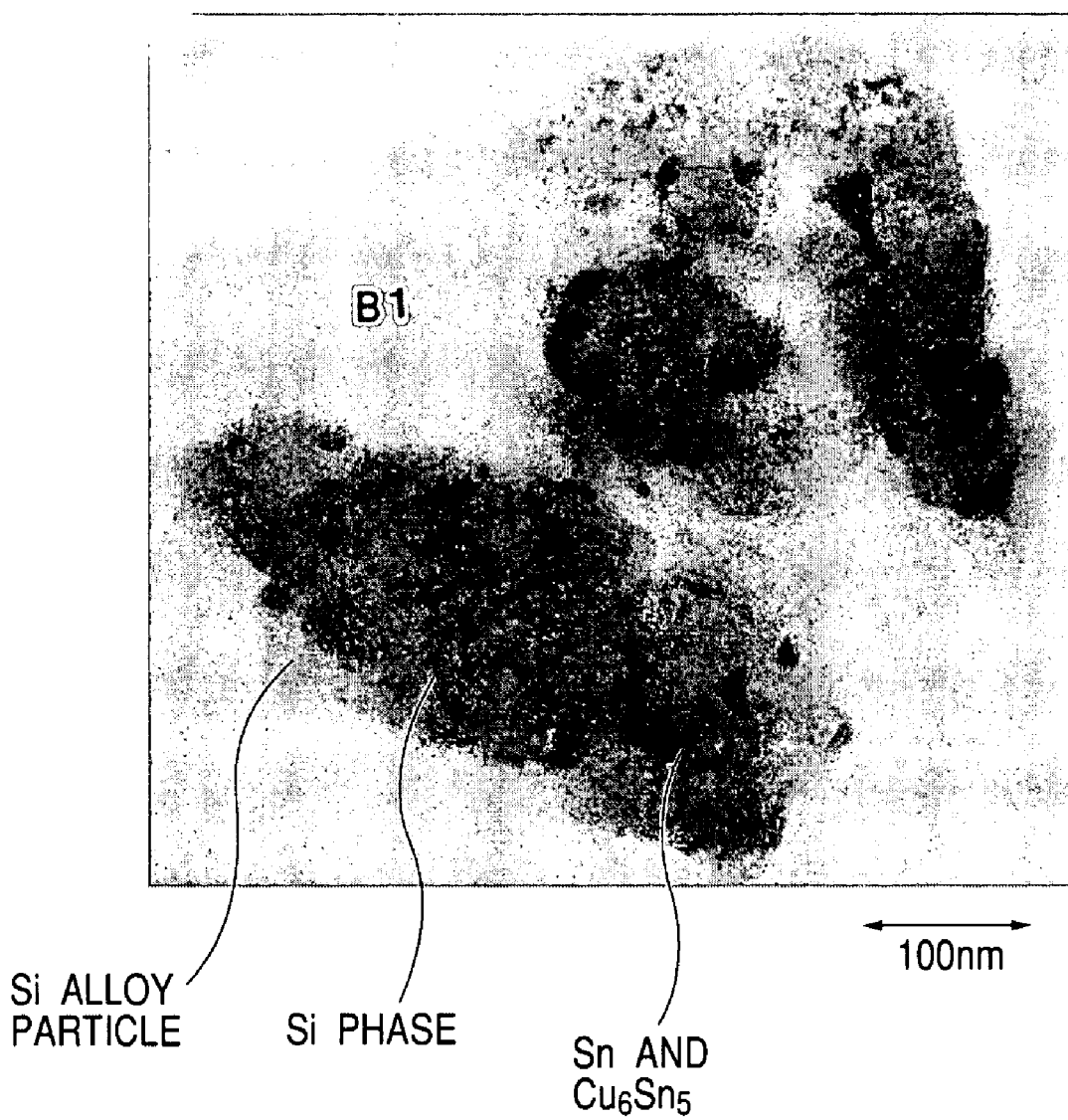
FIG. 9 is a transmission electron microscope photograph of the electrode material prepared in Example 1 of the present invention.
Figure 10:
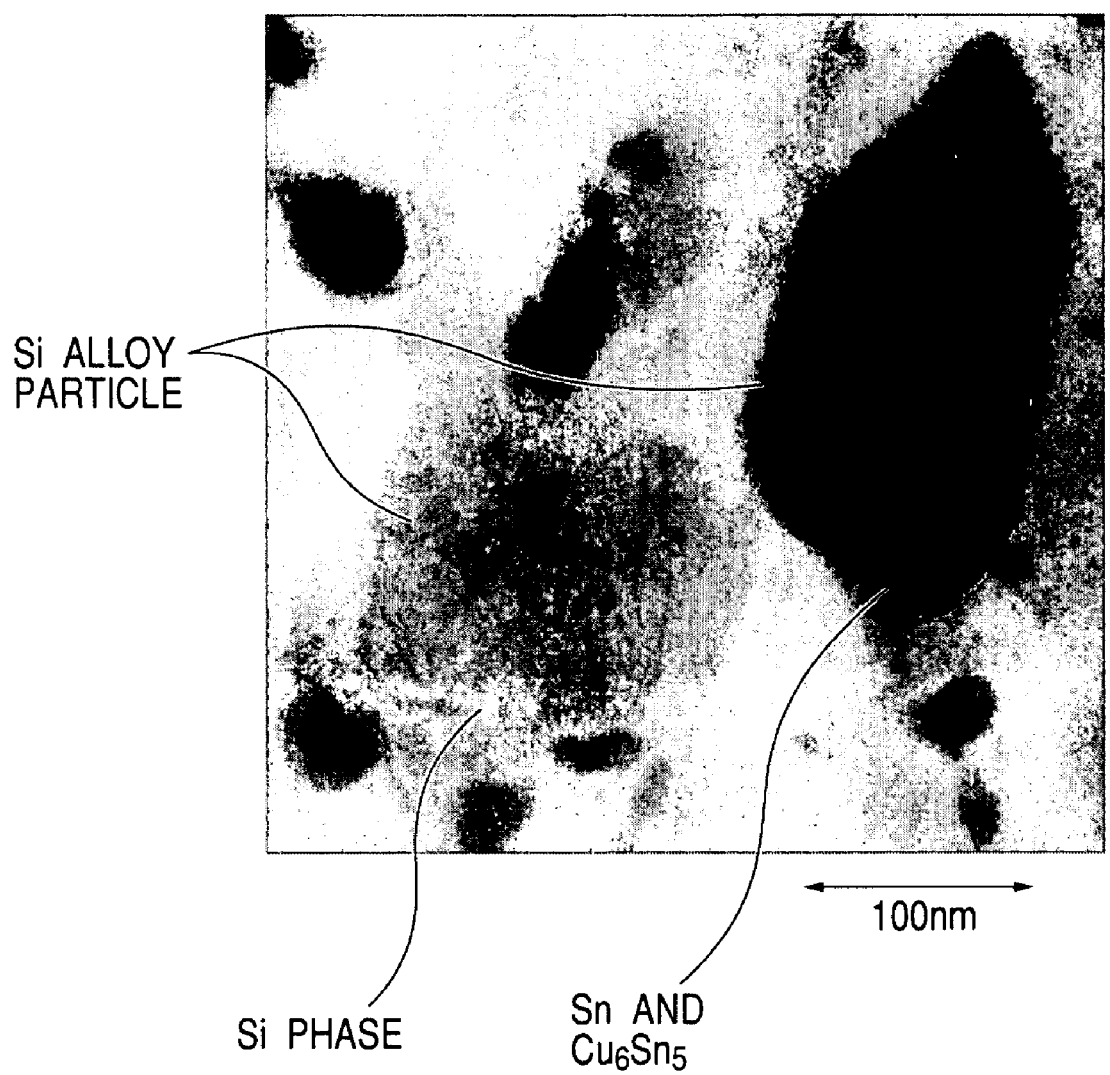
FIG. 10 is a transmission electron microscope photograph of the electrode material prepared in Reference Example 1.
Figure 11:
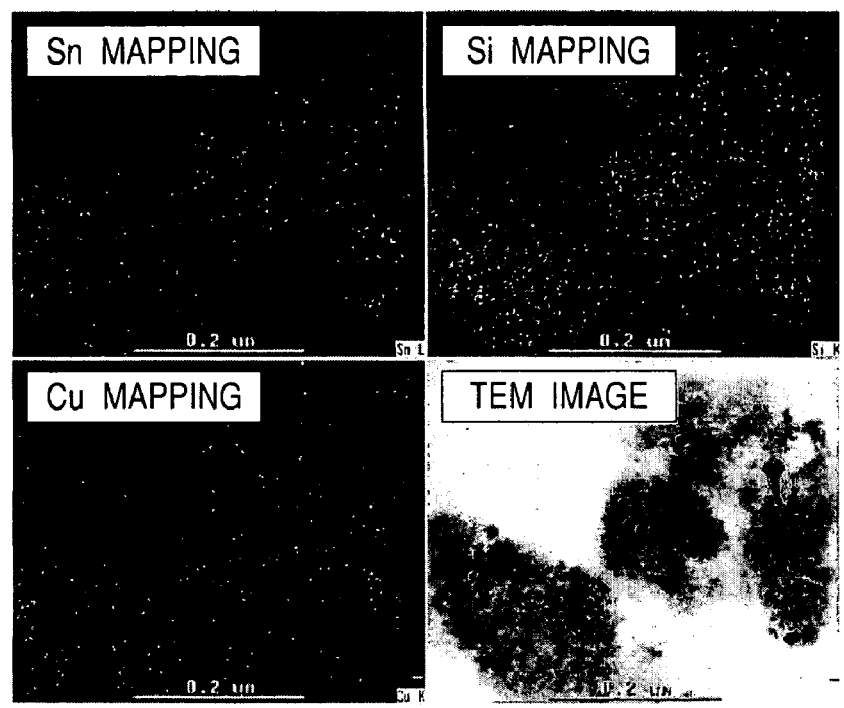
FIG. 11 is views illustrating the results of elemental mapping by means of the energy dispersive X-ray spectroscopy (EDXS) analysis of the electrode material prepared in Example 1 of the present invention.
Figure 12:
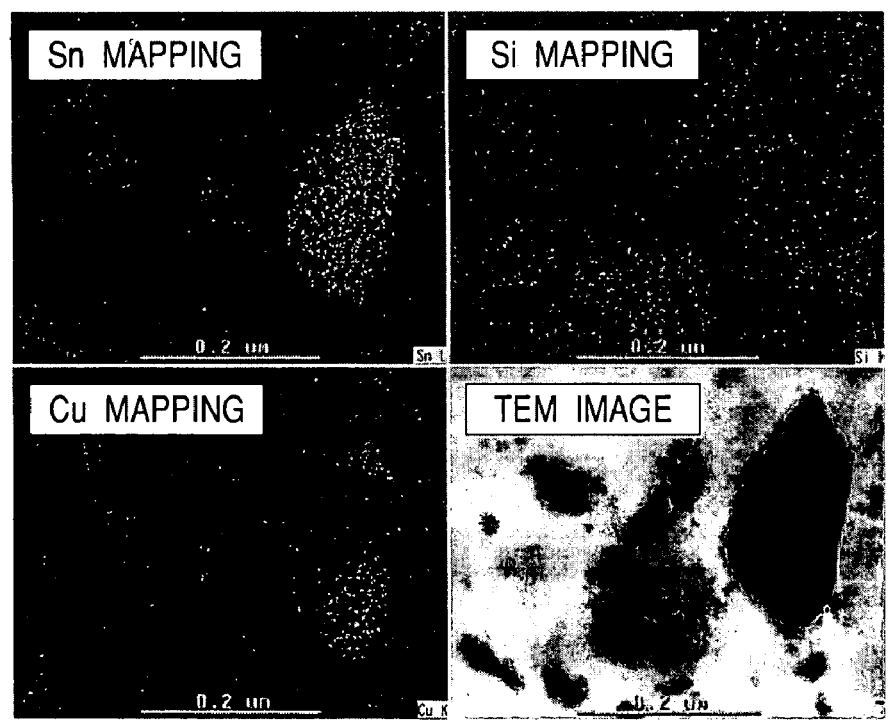
FIG. 12 is views illustrating the results of elemental mapping by means of EDXS analysis of the electrode material prepared in Reference Example 1.

Next, the elemental distributions in the alloys using the electrode materials made in Example 1 and Reference Example 1 were investigated. FIGS. 9 and 10 are photographs obtained by TEM observation of the electrode materials made in Example 1 and Reference Example 1. Further, FIGS. 11 and 12 show the results of elemental mapping using the EDXS analysis.

From these results, it was seen that the portion of a low color density was an Si phase, and the portions of high color densities were an Sn phase and a $Cu_6Sn_5$ phase. It was seen from FIG. 9 that the electrode material made in Example 1 was small in nonuniformity of color density, and therefore that the Sn phase and the $Sn_6Cu_5$ phase were dispersed uniformly in the Si phase. In contrast, it was seen from FIG. 10 that the electrode material made in Reference Example 1 was large in nonuniformity of color density within the alloy particle, and therefore that the Si phase and the Sn phase and the $Sn_6Cu_5$ phase were present nonuniformly within the particles.

Further, the same observation results were obtained for Example 2 and Reference Example 2, Example 3 and Reference Example 3, and Example 4 and Reference Example 4.

Next, as will be described below, electrode structures were manufactured using the fine powders of the silicon alloys obtained following the procedures described above and evaluated for the lithium insertion/release performance thereof.

First, 66.5% by weight of each of the silicon alloy fine powders obtained by the above procedure, 10.0% by weight of a flat graphite powder as a conductive auxiliary material (specifically, graphite powder with a substantially disk-shaped particles of a diameter of about 5 µm and a thickness of about 5 µm), 6.0% by weight of a graphite powder (substantially spherical particles with an average particle size of 0.5 to 1.0 µm), 4.0% by weight of an acetylene black powder (substantially spherical particles with an average particle size of $4 \times 10^{-2}$ µm), 10.5% by weight of polyvinyl alcohol as a binder and 3.0% by weight of sodium carboxymethyl cellulose were mixed and kneaded with addition of water to prepare a paste.

Next, the thus prepared paste was applied on an electrical field copper foil (electrochemically produced copper foil) of 15 µm in thickness by means of a coater and dried, and the thickness was adjusted with a roller press machine to obtain an electrode structure having an active material layer with a thickness of 25 µm.

The resultant electrode structure was cut into a shape/size of 2.5 cm×2.5 cm square and a copper tub was welded thereto to obtain a silicon electrode. (Evaluation Procedure for Lithium Insertion/Release)

Next, a lithium metal foil of 100 µm in thickness was pressure bonded to a copper foil to make a lithium electrode. Next, ethylene carbonate and diethyl carbonate were mixed at a volume ratio of 3:7 to obtain an organic solvent, to which a $LiPF_6$ salt was dissolved at a concentration of 1 M (mol/L) to prepare an electrolyte solution.

Then, the electrolyte solution was impregnated into a porous polyethylene film of 25 µm in thickness. Next, the above silicon electrode was arranged on one surface of the polyethylene film and the above lithium electrode was arranged on the other surface of the polyethylene film such that the polyethylene film was sandwiched by the electrodes. In order to provide flatness, this stack was pinched by a pair of glass sheets, and then covered with an aluminum laminated film to make an evaluation cell.

This aluminum laminated film was a three-layered film consisting of an outermost nylon film layer, a middle aluminum foil layer with a thickness of 20 µm, and an inside polyethylene film layer. The output terminal portions of the electrodes were sealed by fusion without lamination.

In order to evaluate the performance of the above electrode structure as a negative electrode, a lithium insertion/release cycle test (charge/discharge cycle test) was performed.

Namely, the evaluation cell was connected to a charging/discharging apparatus with the lithium electrode being the anode and the silicon electrode being the cathode. First, the evaluation cell was discharged at a current density of 0.112 mA/cm² (70 mA per 1 g of the active material layer of the silicon electrode, that is, 70 mA/gram of electrode layer weight) to insert lithium into the silicon electrode layer, then the evaluation cell was charged at a current density of 0.32 MA/cm² (200 mA/gram of electrode layer weight) to release lithium from the silicon layer, and the electricity amount involved in lithium insertion/release per unit weight of the silicon electrode layer, or the silicon powder or silicon alloy powder was evaluated at a voltage range of 0 to 1.2 V.

Figure 13:
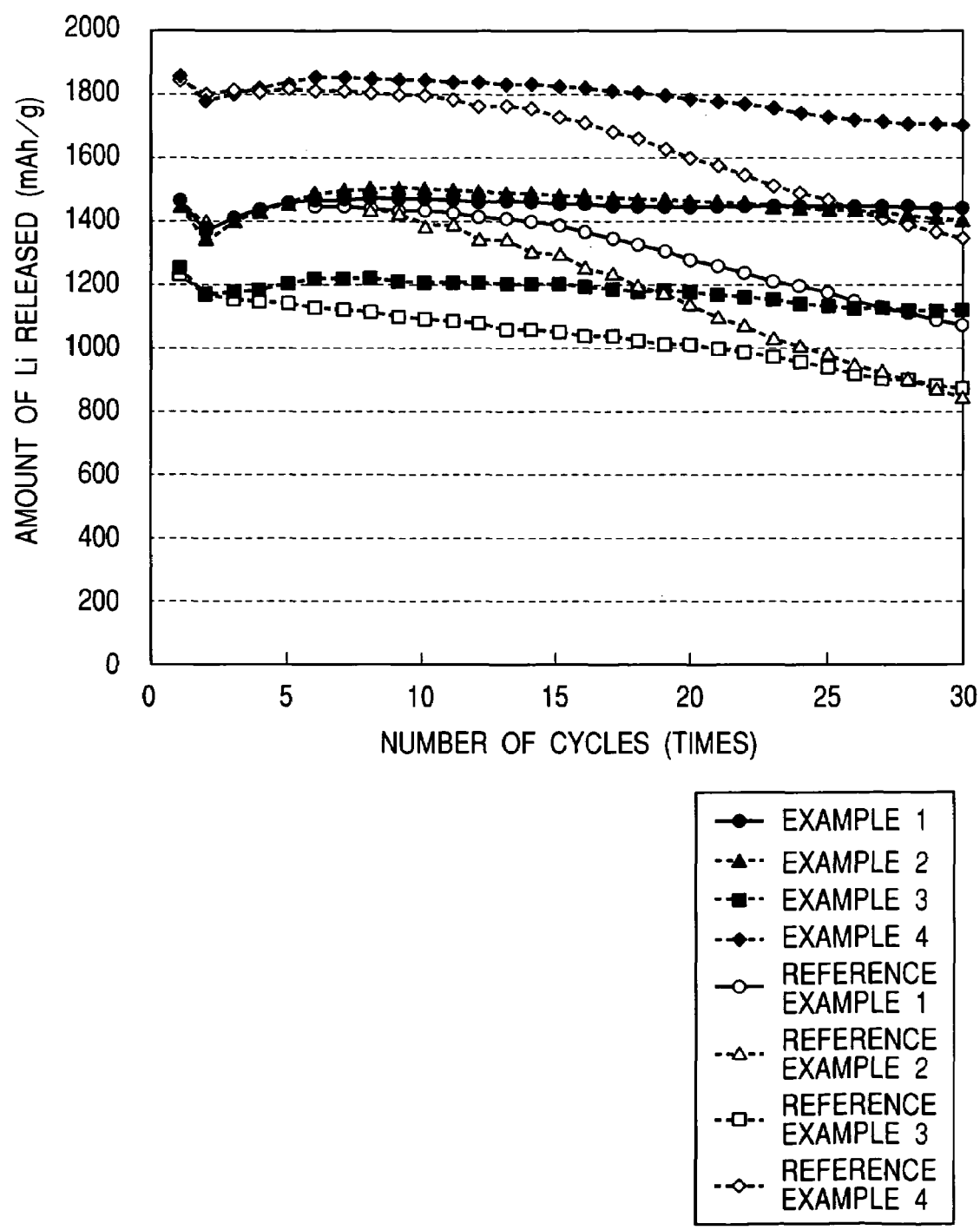
FIG. 13 is a graphical representation showing the results of release/insertion cycle tests of the electrodes prepared in Examples 1 to 4 of the present invention and Reference Examples 1 to 4.

FIG. 13 is a view showing the results of the lithium insertion/release cycle test of the electrode structures of Examples 1 to 4 and Reference Examples 1 to 4, wherein the abscissa indicates the number of cycles and the ordinate represents the amount of lithium released.

As shown by FIG. 13, for the electrodes of Reference Examples 1 to 4 in which the intermetallic compound of Sn or Zn is not uniformly disperse in the Si phase, the amount of Li released decreases as the cycles are repeated. However, for the electrodes of Examples 1 to 4 of the present invention where the intermetallic compound of Sn or Zn is uniformly disperse in the Si phase, the amount of Li released does not decrease. Thus, it was seen that the silicon alloy electrodes made in the examples of the present invention each had a longer life.

Next, a secondary battery was made as Example 5 of the present invention.

Example 5

In this example, an electrode structure having electrode layers formed on both sides of a current collector was made using a negative electrode material according to the present invention. The thus made electrode structure was used as a negative electrode to make a lithium secondary battery of a 18650 size (diameter 18 mmφ×height 65 mm) having the sectional structure as shown in FIG. 5.

1. Preparation of Negative Electrode 403

The negative electrode 403 was made according to the following procedure using the electrode materials of Examples 1 to 4.

First, 66.5% by weight of each of the silicon alloy fine powders obtained by the above procedure, 10.0% by weight of a flat graphite powder as a conductive auxiliary material (specifically, graphite powder with a substantially disk-shaped particles of a diameter of about 5 µm and a thickness of about 5 µm), 6.0% by weight of a graphite powder (substantially spherical particles with an average particle size of 0.5 to 1.0 µm), 4.0% by weight of an acetylene black powder (substantially spherical particles with an average particle size of $4 \times 10^{-2}$ µm), and 13.5% by weight of a binder were mixed, and N-methyl-2-pyrrolidone was added to prepare a paste.

Incidentally, as the binder, polyamide-imide was used for the electrode materials of Examples 1 and 2, and polyamic acid (polyamide precursor) was used for the electrode materials of Examples 3 and 4.

Next, the thus prepared paste was applied on an electrical field copper foil (electrochemically produced copper foil) of 15 µm in thickness by means of a coater and dried, and the thickness was adjusted with a roller press machine to prepare an electrode structure having an active material layer with a thickness of 25 µm.

The electrode structure having electrode layers provided on both sides of the current collector according to the above procedure was cut into a predetermined size, and a lead of a nickel ribbon was connected to the electrode by spot welding to obtain the negative electrode 403.

2. Preparation of Positive Electrode 406

(1) Lithium citrate and cobalt nitrate were mixed at a molar ratio of 1:3, followed by addition of citric acid, and the resulting mixture was then dissolved in ion-exchanged water to obtain a solution. The solution was sprayed into an air stream of 200° C. to prepare a precursor of a lithium-cobalt oxide fine powder.

(2) The precursor of a lithium-cobalt oxide prepared in above (1) was heat-treated in an air stream at 850° C.

(3) The lithium-cobalt oxide prepared in above (2) was mixed with 3% by weight of a graphite powder and 5% by weight of a polyvinylidene fluoride powder, to which N-methyl-2-pyrrolidone was then added to make a paste.

(4) The paste obtained in above (3) was applied on both surfaces of an aluminium foil of a thickness of 20 μm as the current collector 404, then dried and the thickness the positive electrode material layer on each side was adjusted with a roller press machine to 90 μm. Further, an aluminium lead was connected by an ultrasonic welding machine, and dried at 150° C. under a reduced pressure to prepare the positive electrode 406.

3. Preparation Procedure of Electrolyte Solution (1) Ethylene carbonate and diethyl carbonate whose moisture had been sufficiently removed were mixed at a volume ratio of 3:7 to prepare a solvent.

(2) Into the solvent obtained in above (1) was dissolved lithium tetrafluoroborate (LiBF$_4$) at a concentration of 1 M (mole/L) to obtain an electrolyte solution.

4. Separator 407

A microporous polyethylene film of 25 μm in thickness was used as the separator.

5. Battery Assembly

Assembly was entirely conducted in a dry atmosphere controlled in moisture with a dew point of −50° C. or less.

The separator 407 was sandwiched between the negative electrode 403 and the positive electrode 406, and the sandwiched member was then spirally wound so as to have a structure of separator/positive electrode/separator/negative electrode/separator, and inserted in the negative electrode can 408 made of stainless steel.

Next, the negative electrode lead 412 was spot-welded to a bottom portion of the negative electrode can 408. A constriction was formed at an upper portion of the negative electrode can by means of a necking machine, and the positive electrode lead 413 was welded to the positive electrode cap 409 provided with a gasket 410 made of polypropylene by means of a spot welding machine.

(3) Next, after an electrolyte solution had been injected, the positive electrode cap was put on, and the positive electrode cap and the negative electrode can were caulked with a caulking machine and sealed to prepare the battery.

Incidentally, the battery was a positive electrode capacity regulated battery in which the negative electrode capacity was larger than the positive electrode capacity.

(6) Evaluation

Charging/discharging was performed for each of the batteries, and the discharging capacity was measured.

As a result, the discharging capacities of the lithium secondary batteries using the electrode structures formed of the electrode materials of Examples 1 to 4 as the negative electrodes all exceeded 2800 mAh. Further, even at the 100th cycle, discharging capacities corresponding to 75% or more of the initial capacities were maintained.

As described above, according to the preferable examples of the present invention, a high capacity secondary battery can be produced in which a drop in capacity due to repeated charging/discharging is small, and the charge/discharge cycle life is improved.

What is claimed is:

1. An electrode material for a lithium secondary battery, the electrode material comprising alloy particles, the alloy particles comprising:
   a silicon phase as a major component; and
   an intermetallic compound dispersed in the silicon phase,
   wherein the intermetallic compound contains tin and at least one element selected from the group consisting of copper, nickel, cobalt, iron, manganese, vanadium, molybdenum, niobium, tantalum, titanium, zircon, yttrium, lanthanum, selenium, magnesium and silver,
   wherein the alloy particles have an average particle diameter of 0.02 μm to 5 μm, and
   wherein the crystallite size of the silicon phase is not less than 2 nm but no more than 500 nm, as determined by the Scherrer Equation Lc=0.94$\lambda$/($\beta$cos $\theta$), where Lc is the crystallite size, $\lambda$ is the wavelength of the X-ray beam, $\beta$ is the full width at half maximum of peak and $\theta$ is the Bragg angle of diffracted rays.

2. The electrode material for a lithium secondary battery according to claim 1, wherein the intermetallic compound contains at least one element selected from the group consisting of copper, nickel, cobalt, iron, manganese, vanadium, molybdenum, niobium, tantalum, zircon, yttrium, lanthanum, selenium and magnesium.

3. The electrode material for a lithium secondary battery according to claim 1, wherein the alloy particles further comprise at least one metal element present in an elemental metal state selected from the group consisting of tin, aluminum, zinc, indium, antimony, bismuth and lead.

4. The electrode material for a lithium secondary battery according to claim 1, wherein the content of silicon in the alloy particles is not less than 50% by weight but no more than 90% by weight.

5. An electrode structure comprising the electrode material set forth in claim 1, a conductive auxiliary material, a binder and a current collector.

6. The electrode structure according to claim 5, wherein the conductive auxiliary material is a carbonaceous material.

7. A secondary battery, which comprises a negative electrode using the electrode structure set forth in claim 5, an electrolyte and a positive electrode, and which utilizes an oxidation reaction of lithium and a reduction reaction of lithium ions.

* * * * *

UNITED STATES PATENT AND TRADEMARK OFFICE
CERTIFICATE OF CORRECTION

PATENT NO. : 7,378,041 B2
APPLICATION NO. : 10/809483
DATED : May 27, 2008
INVENTOR(S) : Asao et al.

It is certified that error appears in the above-identified patent and that said Letters Patent is hereby corrected as shown below:

ON THE TITLE PAGE:
Item (56) Other Publications, "B.D. Cullity, "Elements of X-ray Diffraction, $2^{nd}$ Ed., Addison-Wesley Publishing Company, Inc., pp. 100-103." should be deleted (duplicate).

COLUMN 2:
Line 30, "tofor," should read -- tofore, --.

COLUMN 3:
Line 10, "disposition" should read -- deposition --.

COLUMN 4:
Line 15, "is" should read -- shows --;
Line 19, "is" should read -- shows --; and
Line 64, "disperses" should read -- dispersed --.

COLUMN 5:
Line 16, "con," should read -- conium, --.

COLUMN 6:
Line 44, "µM," should read -- µm, --.

COLUMN 8:
Line 64, "to an" should read -- to a --.

COLUMN 13:
Line 65, "is" should read -- are --.

COLUMN 14:
Line 23, "prepared" should read -- prepare --.

COLUMN 17:
Line 16, "a substantially" should read -- substantially --.

UNITED STATES PATENT AND TRADEMARK OFFICE
CERTIFICATE OF CORRECTION

PATENT NO. : 7,378,041 B2
APPLICATION NO. : 10/809483
DATED : May 27, 2008
INVENTOR(S) : Asao et al.

It is certified that error appears in the above-identified patent and that said Letters Patent is hereby corrected as shown below:

COLUMN 18:
　　Line 1, "MA/cm$^2$" should read -- mA/cm$^2$ --;
　　Line 13, "disperse" should read -- dispersed --;
　　Line 17, "disperse" should read -- dispersed --; and
　　Line 40, "a substantially" should read -- substantially --.

COLUMN 20:
　　Line 22, "zircon," should read -- zirconium, --; and
　　Line 36, "zircon," should read -- zirconium, --.

Signed and Sealed this

Eleventh Day of November, 2008

JON W. DUDAS
*Director of the United States Patent and Trademark Office*